(12) United States Patent
Neuhauser

(10) Patent No.: US 9,378,728 B2
(45) Date of Patent: *Jun. 28, 2016

(54) SYSTEMS AND METHODS FOR GATHERING RESEARCH DATA

(71) Applicant: The Nielsen Company (US), LLC, Schaumburg, IL (US)

(72) Inventor: Alan R. Neuhauser, Silver Spring, MD (US)

(73) Assignee: The Nielsen Company (US), LLC, New York, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/262,315

(22) Filed: Apr. 25, 2014

(65) Prior Publication Data

US 2014/0236592 A1      Aug. 21, 2014

Related U.S. Application Data

(63) Continuation of application No. 13/046,360, filed on Mar. 11, 2011, now Pat. No. 8,731,906, which is a continuation of application No. 11/805,075, filed on May 21, 2007, now Pat. No. 7,908,133, which is a continuation-in-part of application No. 10/256,834, filed on Sep. 27, 2002, now Pat. No. 7,222,071.

(51) Int. Cl.

| G10L 19/00 | (2013.01) |
|---|---|
| G10L 15/00 | (2013.01) |
| G10L 19/018 | (2013.01) |

(Continued)

(52) U.S. Cl.
CPC ................ *G10L 15/00* (2013.01); *G10L 19/018* (2013.01); *H04H 60/58* (2013.01); *H04H 60/65* (2013.01); *H04H 60/31* (2013.01); *H04H 60/37* (2013.01); *H04H 2201/90* (2013.01)

(58) Field of Classification Search
CPC ....... G10L 19/018; G10L 19/02; G10L 15/00; G10L 25/03
USPC .............................................. 725/19; 704/205
See application file for complete search history.

(56) References Cited

U.S. PATENT DOCUMENTS

| 2,662,168 A | 12/1953 | Scherbatskoy |
|---|---|---|
| 3,372,233 A | 3/1968 | Currey |

(Continued)

FOREIGN PATENT DOCUMENTS

| EP | 0275328 | 7/1988 |
|---|---|---|
| EP | 0425347 | 5/1991 |

(Continued)

OTHER PUBLICATIONS

United States Patent and Trademark Office, "Non-Final Office Action", issued in connection with U.S. Appl. No. 13/046,360 dated Nov. 10, 2011 (11 pages).

(Continued)

*Primary Examiner* — Daniel Abebe
(74) *Attorney, Agent, or Firm* — Hanley, Flight & Zimmerman, LLC

(57) ABSTRACT

Methods and systems are provided for gathering research data that includes information pertaining to audio signals received on a portable device, such as a cell phone. Frequency domain data is received or produced, a signature is extracted from the frequency domain data and an ancillary code is read from the frequency domain data.

20 Claims, 13 Drawing Sheets

(51) Int. Cl.
*H04H 60/58* (2008.01)
*H04H 60/65* (2008.01)
*H04H 60/31* (2008.01)
*H04H 60/37* (2008.01)

(56) References Cited

U.S. PATENT DOCUMENTS

| | | | |
|---|---|---|---|
| 3,845,391 A | 10/1974 | Crosby | |
| 3,919,479 A | 11/1975 | Moon et al. | |
| 4,025,851 A | 5/1977 | Haselwood et al. | |
| 4,230,990 A | 10/1980 | Lert, Jr. et al. | |
| 4,425,661 A | 1/1984 | Moses et al. | |
| 4,450,531 A | 5/1984 | Kenyon et al. | |
| 4,622,583 A | 11/1986 | Watanabe et al. | |
| 4,633,302 A | 12/1986 | Damoci | |
| 4,639,779 A | 1/1987 | Greenberg | |
| 4,672,605 A | 6/1987 | Hustig et al. | |
| 4,677,466 A | 6/1987 | Lert, Jr. et al. | |
| 4,697,209 A | 9/1987 | Kiewit et al. | |
| 4,739,398 A | 4/1988 | Thomas et al. | |
| 4,764,808 A | 8/1988 | Solar | |
| 4,843,562 A | 6/1989 | Kenyon et al. | |
| 4,847,685 A | 7/1989 | Gall et al. | |
| 4,858,000 A | 8/1989 | Lu | |
| 4,905,080 A | 2/1990 | Watanabe et al. | |
| 4,918,730 A | 4/1990 | Schulze | |
| 4,930,011 A | 5/1990 | Kiewit | |
| 4,955,070 A | 9/1990 | Welsh et al. | |
| 4,972,471 A | 11/1990 | Gross et al. | |
| 5,165,069 A | 11/1992 | Vitt et al. | |
| 5,294,977 A | 3/1994 | Fisher et al. | |
| 5,305,422 A * | 4/1994 | Junqua | G10L 25/87 704/253 |
| 5,319,735 A | 6/1994 | Preuss et al. | |
| 5,373,315 A | 12/1994 | Dufresne et al. | |
| 5,382,983 A | 1/1995 | Kwoh et al. | |
| 5,394,461 A | 2/1995 | Garland | |
| 5,425,100 A | 6/1995 | Thomas et al. | |
| 5,444,769 A | 8/1995 | Koen et al. | |
| 5,450,490 A | 9/1995 | Jensen et al. | |
| 5,481,294 A | 1/1996 | Thomas et al. | |
| 5,483,276 A | 1/1996 | Brooks et al. | |
| 5,495,282 A | 2/1996 | Mostafa et al. | |
| 5,512,933 A | 4/1996 | Wheatley et al. | |
| 5,526,427 A | 6/1996 | Thomas et al. | |
| 5,572,246 A | 11/1996 | Ellis et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,594,934 A | 1/1997 | Lu et al. | |
| 5,608,445 A | 3/1997 | Mischler | |
| 5,612,729 A | 3/1997 | Ellis et al. | |
| 5,629,739 A | 5/1997 | Dougherty | |
| 5,712,953 A * | 1/1998 | Langs | G10H 3/125 704/208 |
| 5,737,026 A | 4/1998 | Lu et al. | |
| 5,740,035 A | 4/1998 | Cohen et al. | |
| 5,764,763 A | 6/1998 | Jensen et al. | |
| 5,787,334 A | 7/1998 | Fardeau et al. | |
| 5,796,785 A | 8/1998 | Spiero | |
| 5,828,325 A | 10/1998 | Wolosewicz et al. | |
| 5,945,932 A | 8/1999 | Smith et al. | |
| 6,005,490 A | 12/1999 | Higashihara | |
| 6,035,177 A | 3/2000 | Moses et al. | |
| 6,097,441 A | 8/2000 | Allport | |
| 6,154,484 A | 11/2000 | Lee et al. | |
| 6,157,413 A | 12/2000 | Hanafee et al. | |
| 6,175,627 B1 | 1/2001 | Petrovic et al. | |
| 6,467,089 B1 | 10/2002 | Aust et al. | |
| 6,577,713 B1 | 6/2003 | Peterson et al. | |
| 6,675,383 B1 | 1/2004 | Wheeler et al. | |
| 6,745,011 B1 | 6/2004 | Hendrickson et al. | |
| 6,754,470 B2 | 6/2004 | Hendrickson et al. | |
| 6,871,180 B1 | 3/2005 | Neuhauser et al. | |
| 6,970,698 B2 | 11/2005 | Majmundar et al. | |
| 7,379,778 B2 | 5/2008 | Hayes et al. | |
| 7,586,439 B2 | 9/2009 | Percy et al. | |
| 7,587,732 B2 | 9/2009 | Wright et al. | |
| 7,672,843 B2 * | 3/2010 | Srinivasan | G10L 25/48 704/231 |
| 7,894,703 B2 | 2/2011 | Lapstun et al. | |
| 7,908,133 B2 | 3/2011 | Neuhauser | |
| 8,731,906 B2 | 5/2014 | Neuhauser | |
| 2002/0056089 A1 | 5/2002 | Houston | |
| 2002/0059218 A1 | 5/2002 | August et al. | |
| 2002/0112048 A1 | 8/2002 | Gruyer et al. | |
| 2002/0133393 A1 | 9/2002 | Tatsumi et al. | |
| 2003/0005430 A1 | 1/2003 | Kolessar | |
| 2003/0086341 A1 | 5/2003 | Wells et al. | |
| 2003/0170001 A1 | 9/2003 | Breen | |
| 2003/0171833 A1 | 9/2003 | Crystal et al. | |
| 2004/0111738 A1 | 6/2004 | Gunzinger | |
| 2004/0122679 A1 | 6/2004 | Neuhauser et al. | |
| 2004/0210922 A1 | 10/2004 | Peiffer et al. | |
| 2005/0050577 A1 | 3/2005 | Westbrook et al. | |
| 2005/0204379 A1 | 9/2005 | Yamamori | |
| 2006/0110005 A1 | 5/2006 | Tapson | |
| 2007/0006250 A1 | 1/2007 | Croy et al. | |
| 2008/0086304 A1 | 4/2008 | Neuhauser | |
| 2009/0030066 A1 | 1/2009 | Kiss | |
| 2009/0193052 A1 | 7/2009 | FitzGerald et al. | |
| 2010/0268573 A1 | 10/2010 | Jain et al. | |
| 2011/0208515 A1 | 8/2011 | Neuhauser | |
| 2011/0208518 A1 | 8/2011 | Holtel et al. | |
| 2011/0224992 A1 | 9/2011 | Chaqui et al. | |
| 2012/0203363 A1 | 8/2012 | Mckenna et al. | |

FOREIGN PATENT DOCUMENTS

| | | |
|---|---|---|
| EP | 0683451 A2 | 11/1995 |
| EP | 0697773 | 2/1996 |
| EP | 0713335 | 5/1996 |
| EP | 1026847 | 8/2000 |
| EP | 1213860 | 6/2002 |
| EP | 1453286 A1 | 1/2004 |
| JP | 2000307530 | 11/2000 |
| JP | 2002051274 | 2/2002 |
| WO | 91/11062 | 7/1991 |
| WO | 95/12278 | 5/1995 |
| WO | 96/27264 | 9/1996 |
| WO | 98/10539 | 3/1998 |
| WO | 98/26529 | 6/1998 |
| WO | 98/32251 | 7/1998 |
| WO | 99/59275 | 11/1999 |
| WO | 00/04662 | 1/2000 |
| WO | 00/72309 | 11/2000 |
| WO | 0245273 A2 | 6/2002 |
| WO | 03049412 A1 | 6/2003 |
| WO | 2005038625 A2 | 4/2005 |

OTHER PUBLICATIONS

United States Patent and Trademark Office, "Final Office Action", issued in connection with U.S. Appl. No. 13/046,360 dated Apr. 13, 2012 (12 pages).

United States Patent and Trademark Office, "Advisory Action", issued in connection with U.S. Appl. No. 13/046,360 dated Sep. 21, 2012 (2 pages).

United States Patent and Trademark Office, "Notice of Allowance", issued in connection with U.S. Appl. No. 13/046,360 dated Aug. 30, 2013 (8 pages).

United States Patent and Trademark Office, "Notice of Allowance", issued in connection with U.S. Appl. No. 13/046,360 dated Dec. 27, 2013 (6 pages).

United States Patent and Trademark Office, "Corrected Notice of Allowance", issued in connection with U.S. Appl. No. 13/046,360 dated Mar. 19, 2014 (4 pages).

United States Patent and Trademark Office, "Non-Final Office Action", issued in connection with U.S. Appl. No. 11/805,075 dated May 17, 2010 (10 pages).

United States Patent and Trademark Office, "Notice of Allowance", issued in connection with U.S. Appl. No. 11/805,075 dated Nov. 1, 2010 (7 pages).

(56) References Cited

OTHER PUBLICATIONS

International Searching Authority, "International Search Report and Written Opinion", issued in connection with International Patnet Application No. PCT/US12/67062, dated Feb. 5, 2013 (9 pages).
International Searching Authority, "International Search Report and Written Opinion", issued in connection with International Patnet Application No. PCT/US2012/071972, dated Mar. 12, 2013 (12 pages).
Bob Patchen, Meters for the Digital Age, "An Update on Arbitron's Personal Portable Meter", TVB Research Conference, Oct. 14, 1999 (pp. 1-29).
The Manchester 300, "Out of the Lab and into the Field—A Report on the Extended Field Test of Arbitron's Portable People Meter in Manchester, England", 2000 (pp. 1-23).
United States Patent and Trademark Office, "Non-Final Office Action", issued in connection with U.S. Appl. No. 10/256,834, dated Jul. 6, 2004 (12 pages).
United States Patent and Trademark Office, "Final Office Action", issued in connection with U.S. Appl. No. 10/256,834, dated Jun. 21, 2005 (18 pages).
United States Patent and Trademark Office, "Advisory Action", issued in connection with U.S. Appl. No. 10/256,834, dated Mar. 15, 2006 (3 pages).
United States Patent and Trademark Office, "Notice of Allowance", issued in connection with U.S. Appl. No. 10/256,834, dated Sep. 5, 2006 (7 pages).
Stephen Kenyon and Laura Simkins, "High Capacity Real Time Broadcast Monitoring", Systems, Man and Cybernetics, 1991, IEEE Int'l Conf. on Decision Aiding for Complex Systems, vol. 1, Oct. 13-19, 1991, pp. 147-152.

\* cited by examiner

FIGURE 6

| Band No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 10 |  |  | X |  |  |  |  |  | X |  |  |  |  |  |
| 9 |  |  |  | X |  |  |  |  |  | X |  |  |  |  |
| 8 |  |  |  |  | X |  |  |  |  |  | X |  |  |  |
| 7 |  |  |  |  |  | X |  |  |  |  |  | X |  |  |
| 6 |  |  |  |  |  |  | X |  |  |  |  |  | X |  |
| 5 |  | X |  |  |  |  |  | X |  |  |  |  |  |  |
| 4 |  |  | X |  |  |  |  |  | X |  |  |  |  |  |
| 3 |  |  |  | X |  |  |  |  |  | X |  |  |  |  |
| 2 |  |  |  |  | X |  |  |  |  |  | X |  |  |  |
| 1 | X |  |  |  |  | X |  |  |  |  |  |  |  |  |
| Time Intervals | 1 | 2 | 3 | 4 | 5 | 6 | 7 | 8 | 9 | 10 | 11 | 12 | 13 | 14 |

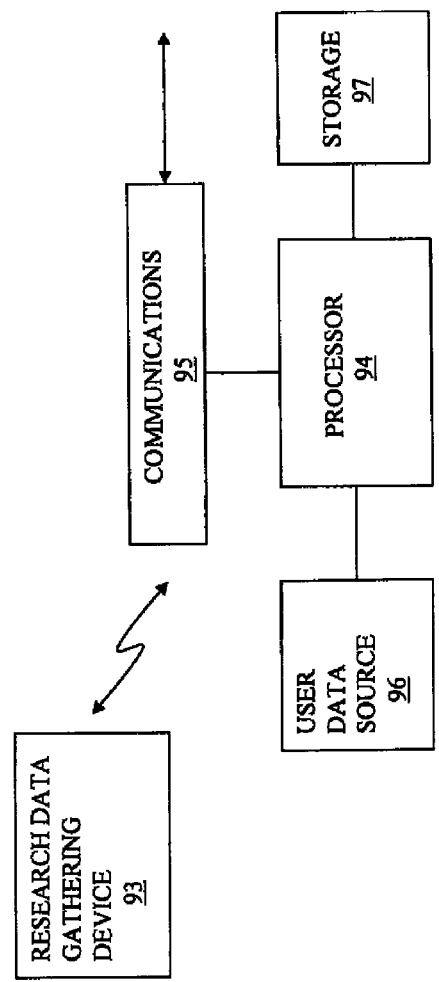

SYSTEMS AND METHODS FOR GATHERING RESEARCH DATA

RELATED APPLICATIONS

This patent arises from a continuation of U.S. patent application Ser. No. 13/046,360 (now U.S. Pat. No. 8,731,906), filed on Mar. 11, 2011, which is a continuation of U.S. patent application Ser. No. 11/805,075 (now U.S. Pat. No. 7,908,133), filed on May 21, 2007, which is a continuation-in-part of U.S. patent application Ser. No. 10/256,834 (now U.S. Pat. No. 7,222,071), filed on Sep. 27, 2002, each of which is hereby incorporated herein by reference in its entirety.

BACKGROUND INFORMATION

Methods and systems for gathering research data are disclosed.

There is considerable interest in identifying and/or measuring the receipt of, and or exposure to, audio data by an audience for use by advertisers, media outlets and others.

The emergence of multiple, overlapping media distribution pathways, as well as the wide variety of available user systems (e.g. PC's, PDA's, portable CD players, Internet, cellular telephones, appliances, TV, radio, etc.) for receiving audio data, has greatly complicated the task of measuring audience receipt of, and exposure to, individual program segments. The development of commercially viable techniques for encoding audio data with program identification data provides a crucial tool for measuring audio data receipt and exposure across multiple media distribution pathways and user systems.

One such technique involves adding an ancillary code to the audio data that uniquely identifies the program signal. Most notable among these techniques is the PPM methodology developed by Arbitron Inc., which is already providing useful audience estimates to numerous media distributors and advertisers.

An alternative technique for identifying program signals is extraction and subsequent matching of "signatures" of the program signals. Such techniques typically involve the use of a reference signature database, which contains a reference signature for each program signal the receipt of which, and exposure to which, is to be measured. Before the program signal is broadcast, these reference signatures are created by measuring the values of certain features of the program signal and creating a feature set or "signature" from these values, commonly termed "signature extraction", which is then stored in the database. Later, when the program signal is broadcast, signature extraction is again performed, and the signature obtained is compared to the reference signatures in the database until a match is found and the program signal is thereby identified.

Past designs of audience measurements systems, like that shown in U.S. Pat. No. 5,481,294 to Thomas et al., have comprised separate metering apparatuses comprising their own distinct code reading and signature extraction capability. Information obtained by each apparatus is then communicated to a central site for processing to produce audience measurement reports. These reports, based on the information obtained, provide data reflecting program exposure.

In obtaining information used in the generation of its reports, the above system is substantially reliant on low levels of background noise and hardwired connections to televisions and radios.

Such constraints make use of the above system(s) impractical when unfettered portability of the metering apparatuses is desirable. Such portability thereof may be desirable in any given number of situations when, for example, connection to a device reproducing media, such as a television or radio, is not feasible, especially where it is desired to monitor out-of-home media exposure.

In a system like that shown in Thomas et al., the process of audience measurement is overly complicated by virtue of the use of multiple metering apparatuses. Because of such use, an excessive amount of power is consumed, so that the system is inefficient. It is particularly ill-suited for use in a portable metering device that must rely on an internal power source, such as a battery.

In systems where audience measurement is an additional function of a device (such as a PDA or cellular telephone), it would be particularly advantageous to provide such functionality in the most efficient manner. To this end, it would be advantageous to minimize usage for this purpose of the processing power and working memory of the device to avoid slowing or otherwise interfering with additional capabilities offered by devices not dedicated to the task of audience measurement. Additionally, whether a portable metering device is or is not dedicated to the task of audience measurement, the power supply thereof, typically a battery, can be exhausted prematurely where excessive power is required to implement this function. Thus, it would be advantageous to provide the above-mentioned media monitoring capabilities while minimizing occurrence of the disadvantages discussed.

It would be advantageous to provide methods and systems for the gathering of data concerning the usage of media data that enable an audience member to undertake such activity no matter the situation or location in which media data is available.

It would also be advantageous to provide such methods and systems which gather such data that are useful for determining exposure both to encoded and unencoded media, whether in-home or out-of-home, and which provide the ability to employ portable monitors that are small and unobtrusive and have low power requirements.

It would further be advantageous to provide such methods and systems which gather such data by decoding ancillary codes and extracting signatures in an efficient manner reducing power and processing requirements.

DISCLOSURE

For this application, the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, audio/video, text, images, animations, databases, broadcasts, displays (including but not limited to video displays, posters and billboards), signs, signals, web pages, print media and streaming media data.

The term "research data" as used herein means data comprising (1) data concerning usage of media data, (2) data concerning exposure to media data, and/or (3) market research data.

The term "presentation data" as used herein means media data or content other than media data to be presented to a user.

The term "ancillary code" as used herein means data encoded in, added to, combined with or embedded in media data to provide information identifying, describing and/or The terms "reading" and "read" as used herein mean a process or processes that serve to recover research data that has been added to, encoded in, combined with or embedded in, media data.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

The term "network" as used herein includes both networks and internetworks of all kinds, including the Internet, and is not limited to any particular network or inter-network.

The terms "first", "second", "primary" and "secondary" are used to distinguish one element, set, data, object, step, process, function, activity or thing from another, and are not used to designate relative position, or arrangement in time or relative importance, unless otherwise stated explicitly.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," and "communicating" and as used herein include both conveying data from a source to a destination, and delivering data to a communications medium, system, channel, network, device, wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

The term "processor" as used herein means processing devices, apparatus, programs, circuits, components, systems and subsystems, whether implemented in hardware, software or both, and whether or not programmable. The term "processor" as used herein includes, but is not limited to one or more computers, hardwired circuits, signal modifying devices and systems, devices and machines for controlling systems, central processing units, programmable devices and systems, field programmable gate arrays, application specific integrated circuits, systems on a chip, systems comprised of discrete elements and/or circuits, state machines, virtual machines, data processors, processing facilities and combinations of any of the foregoing.

The terms "storage" and "data storage" as used herein mean one or more data storage devices, apparatus, programs, circuits, components, systems, subsystems, locations and storage media serving to retain data, whether on a temporary or permanent basis, and to provide such retained data.

The terms "panelist," "panel member," "respondent" and "participant" are interchangeably used herein to refer to a person who is, knowingly or unknowingly, participating in a study to gather information, whether by electronic, survey or other means, about that person's activity.

The term "household" as used herein is to be broadly construed to include family members, a family living at the same residence, a group of persons related or unrelated to one another living at the same residence, and a group of persons (of which the total number of unrelated persons does not exceed a predetermined number) living within a common facility, such as a fraternity house, an apartment or other similar structure or arrangement, as well as such common residence or facility.

The term "activity" as used herein includes, but is not limited to, purchasing conduct, shopping habits, viewing habits, computer usage, Internet usage, exposure to media, personal attitudes, awareness, opinions and beliefs, as well as other forms of activity discussed herein.

The term "research device" as used herein shall mean (1) a portable user appliance configured or otherwise enabled to gather, store and/or communicate research data, or to cooperate with other devices to gather, store and/or communicate research data, and/or (2) a research data gathering, storing and/or communicating device.

The term "portable user appliance" (also referred to herein, for convenience, by the abbreviation "PUA") as used herein means an electrical or non-electrical device capable of being carried by or on the person of a user or capable of being disposed on or in, or held by, a physical object (e.g., attache, purse) capable of being carried by or on the user, and having at least one function of primary benefit to such user, including without limitation, a cellular telephone, a personal digital assistant ("PDA"), a Blackberry device, a radio, a television, a game system (e.g., a Gameboy® device), a notebook computer, a laptop computer, a GPS device, a personal audio device (such as an MP3 player or an iPod® device), a DVD player, a two-way radio, a personal communications device, a telematics device, a remote control device, a wireless headset, a wristwatch, a portable data storage device (e.g., Thumb™ drive), a camera, a recorder, a keyless entry device, a ring, a comb, a pen, a pencil, a notebook, a wallet, a tool, a flashlight, an implement, a pair of glasses, an article of clothing, a belt, a belt buckle, a fob, an article of jewelry, an ornamental article, a shoe or other foot garment (e.g., sandals), a jacket, and a hat, as well as any devices combining any of the foregoing or their functions.

Portable meters are disclosed that implement an ability to read ancillary codes in audio media as well as an ability to extract signatures from audio media to gather information concerning media to which an audience member has been exposed. The meter carries out a transformation of received audio media data from a time domain to a frequency domain and makes use of the transformed audio media data both to read an ancillary code therein and to extract a signature therefrom. Since a common transformation is used both for reading a code and for extracting a signature therefrom, the processing and working memory resources of the portable device required for implementing the functions of the audience meter are advantageously reduced. Likewise, the audience metering functionality thus imposes lower energy demands on the data processing and storage resources of the portable meter.

A method of gathering research data in a portable monitoring device is provided. The method comprises receiving time domain audio media data in a portable monitoring device of an audience member; converting the time domain audio media data to frequency domain data; and processing the frequency domain data for reading an ancillary code therefrom and for extracting a signature therefrom.

A portable audience monitoring system is provided. The system comprises an input arranged to receive time domain audio media data; and a processor coupled with the input to receive the time domain audio media data therefrom and configured to convert the time domain audio media data to frequency domain data, and to process the frequency domain data to read an ancillary code therefrom and to extract a signature therefrom.

A method of gathering research data is provided. The method comprises receiving frequency domain data comprising data representing values of media data in different respective frequency bands; and reading an ancillary code from the frequency domain data and extracting a signature from the frequency domain data.

A further method of gathering research data is provided. The method comprises receiving media data in portable audience monitoring device; converting the media data to a frequency domain to produce frequency domain data; and extracting a signature from the frequency domain data and reading an ancillary code therefrom.

BRIEF DESCRIPTION OF THE DRAWINGS

Embodiments of the present invention are illustrated by way of example and not limitation in the figures of the accompanying drawings, in which like references indicate similar elements and in which:

FIG. 6 is a diagram illustrating a method of identifying research data gathered by one or more of the systems disclosed herein;

FIG. 7E is a diagram of a PUA communicating with the research data monitor of FIGS. 7A, 7B and 7C.

DETAILED DESCRIPTION

Figure 1:
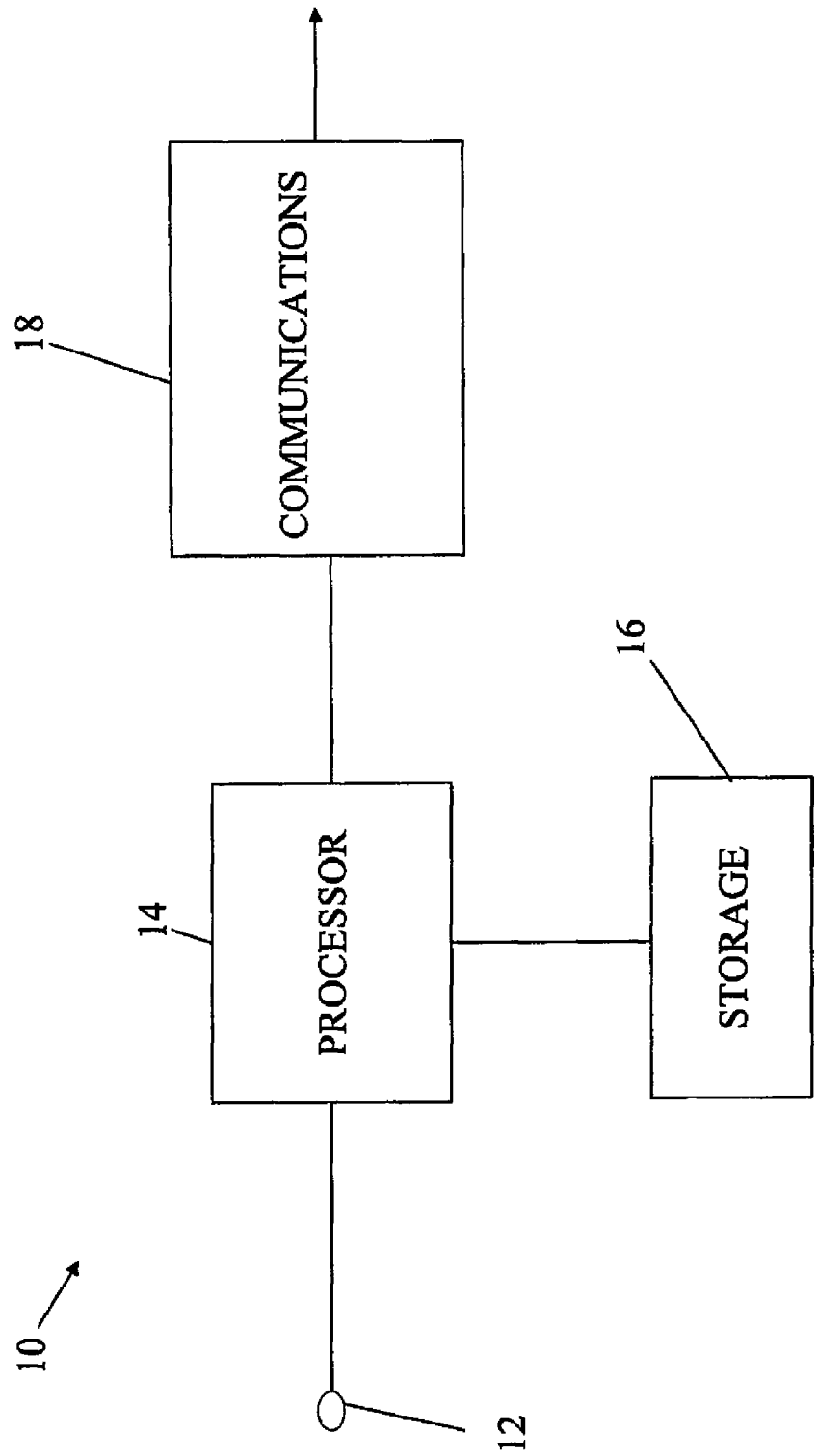
FIG. 1 is a functional block diagram for use in illustrating methods and systems for gathering research data.

The disclosed methods and systems, as well as particular features and advantages of various embodiments thereof will become more apparent from the following detailed description considered with reference to the accompanying drawings in which the same elements depicted in different drawing figures are assigned the same reference numerals.

FIG. 1 is a diagram illustrating certain embodiments of a research data gathering system 10. A monitoring device 12 is provided for receiving monitored data. The monitoring device 12 can comprise either a single device or multiple devices, stationary at a source to be monitored, or multiple devices, stationary at multiple sources to be monitored. Alternatively, the monitoring device 12 can be incorporated in a portable monitoring device that can be carried by an individual to monitor various sources as the individual moves about.

Where acoustic data including media data, such as audio data, is monitored, the monitoring device 12 typically would be an acoustic transducer such as a microphone, having an input which receives media data in the form of acoustic energy and which serves to transduce the acoustic energy to electrical data. Where media data in the form of light energy, such as video data, is monitored, the monitoring device 12 takes the form of a light-sensitive device, such as a photodiode, or a video camera. Light energy including media data could be, for example, light emitted by a video display. The device 12 can also take the form of a magnetic pickup for sensing magnetic fields associated with a speaker, a capacitive pickup for sensing electric fields or an antenna for electromagnetic energy. In still other embodiments, the device 12 takes the form of an electrical connection to a monitored device, which may be a television, a radio, a cable converter, a satellite television system, a game playing system, a VCR, a DVD player, a portable player, a computer, a web appliance, or the like. In still further embodiments, the monitoring device 12 is embodied in monitoring software running on a computer to gather media data.

A processor 14, coupled to the monitoring device 12, is provided for processing the monitored data. Storage device 16, coupled to processor 14, receives data from the processor 14 for storage. Communications 18 is coupled with the processor 14 and is provided for communicating the processed data to a processing facility for use in preparing reports including research data.

Figure 2:
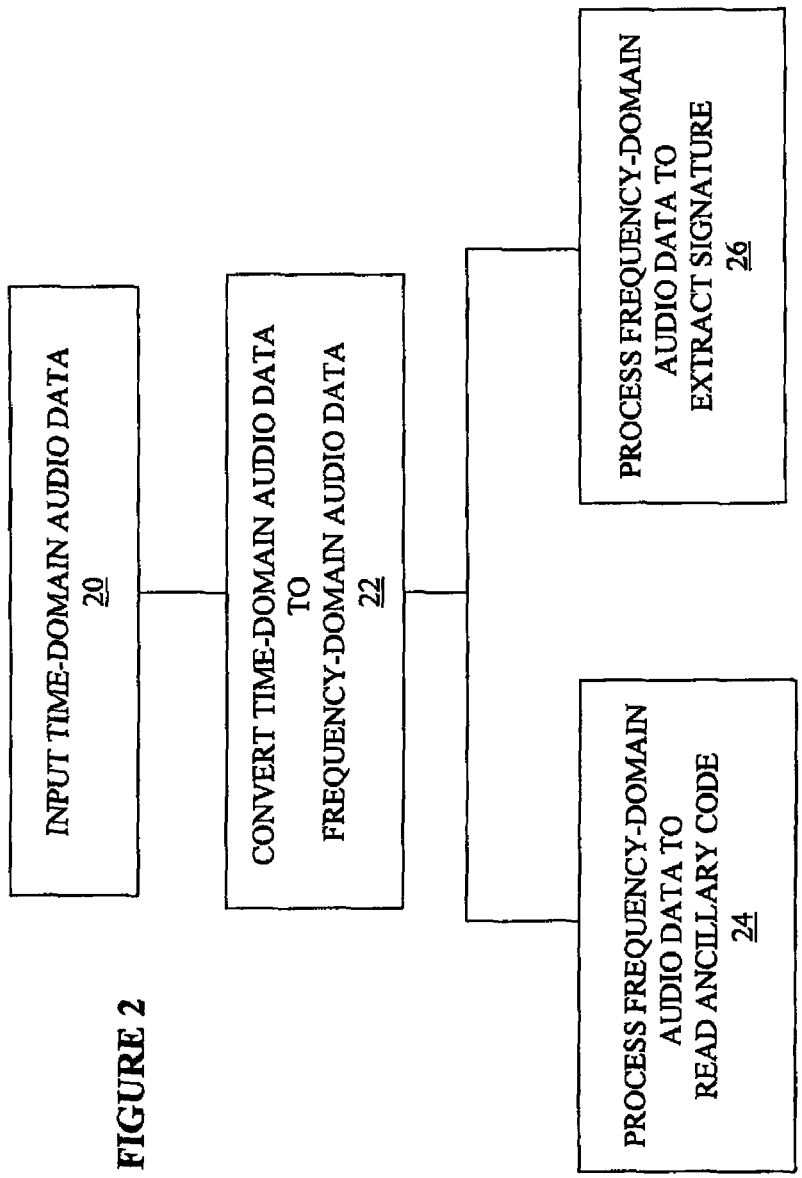
FIG. 2 is a flow diagram for use in illustrating methods for gathering research data.

FIG. 2 is a diagram for use in explaining operation of certain embodiments of the system of FIG. 1. As shown at 20, time-domain audio data is received by the monitoring device 12. Once received, the time-domain audio data, representing the audio signal as it varies over time, is converted by processor, as shown at 22, to frequency-domain audio data, i.e., data representing the audio signal as it varies with frequency. As will be understood by one of ordinary skill in the art, conversion from the time domain to the frequency domain may be accomplished by any one of a number of existing techniques comprising, for instance, discrete Fourier transform, fast Fourier transform (FFT), DCT, wavelet transform, Hadamard transform or other time-to-frequency domain transformation, or else by digital or analog filtering. Processor 14 stores the frequency-domain audio data temporarily in storage 16.

Processor 14 processes the frequency-domain audio data to read an ancillary code therefrom, as shown at 24, as well as to extract a signature therefrom, i.e., data expressing information inherent to an audio signal, as shown at 26, for use in identifying the audio signal or obtaining other information concerning the audio signal (such as a source or distribution path thereof).

Where audio media includes ancillary codes, suitable decoding techniques are employed to detect the encoded information, such as those disclosed in U.S. Pat. No. 5,450, 490 and U.S. Pat. No. 5,764,763 to Jensen, et al., U.S. Pat. No. 5,579,124 to Aijala, et al., U.S. Pat. Nos. 5,574,962, 5,581,800 and 5,787,334 to Fardeau, et al., U.S. Pat. No. 6,871,180 to Neuhauser, et al., U.S. Pat. No. 6,862,355 to Kolessar, et al., U.S. Pat. No. 6,845,360 to Jensen, et al., U.S. Pat. No. 5,319,735 to Preuss et al., U.S. Pat. No. 5,687,191 to Lee, et al., U.S. Pat. No. 6,175,627 to Petrovich et al., U.S. Pat. No. 5,828,325 to Wolosewicz et al., U.S. Pat. No. 6,154,484 to Lee et al., U.S. Pat. No. 5,945,932 to Smith et al., US 2001/0053190 to Srinivasan, US 2003/0110485 to Lu, et al., U.S. Pat. No. 5,737,025 to Dougherty, et al., US 2004/0170381 to Srinivasan, and WO 06/14362 to Srinivasan, et al., all of which hereby are incorporated by reference herein.

Examples of techniques for encoding ancillary codes in audio, and for reading such codes, are provided in Bender, et al., "Techniques for Data Hiding", IBM Systems Journal, Vol. 35, Nos. 3 & 4, 1996, which is incorporated herein by reference in its entirety. Bender, et al. disclose a technique for encoding audio termed "phase encoding" in which segments of the audio are transformed to the frequency domain, for example, by a discrete Fourier transform (DFT), so that phase data is produced for each segment. Then the phase data is modified to encode a code symbol, such as one bit. Processing of the phase encoded audio to read the code is carried out by synchronizing with the data sequence, and detecting the phase encoded data using the known values of the segment length, the DFT points and the data interval.

Bender, et al. also describe spread spectrum encoding and decoding, of which multiple embodiments are disclosed in the above-cited Aijala, et al. U.S. Pat. No. 5,579,124.

Still another audio encoding and decoding technique described by Bender, et al. is echo data hiding in which data is embedded in a host audio signal by introducing an echo. Symbol states are represented by the values of the echo delays, and they are read by any appropriate processing that serves to evaluate the lengths and/or presence of the encoded delays.

A further technique, or category of techniques, termed "amplitude modulation" is described in R. Walker, "Audio Watermarking", BBC Research and Development, 2004. In this category fall techniques that modify the envelope of the audio signal, for example by notching or otherwise modifying brief portions of the signal, or by subjecting the envelope to longer term modifications. Processing the audio to read the code can be achieved by detecting the transitions representing a notch or other modifications, or by accumulation or integration over a time period comparable to the duration of an encoded symbol, or by another suitable technique.

Another category of techniques identified by Walker involves transforming the audio from the time domain to some transform domain, such as a frequency domain, and then encoding by adding data or otherwise modifying the transformed audio. The domain transformation can be carried out by a Fourier, DCT, Hadamard, Wavelet or other transformation, or by digital or analog filtering. Encoding can be achieved by adding a modulated carrier or other data (such as noise, noise-like data or other symbols in the transform domain) or by modifying the transformed audio, such as by notching or altering one or more frequency bands, bins or combinations of bins, or by combining these methods. Still other related techniques modify the frequency distribution of the audio data in the transform domain to encode. Psychoacoustic masking can be employed to render the codes inaudible or to reduce their prominence. Processing to read ancillary codes in audio data encoded by techniques within this category typically involves transforming the encoded audio to the transform domain and detecting the additions or other modifications representing the codes.

A still further category of techniques identified by Walker involves modifying audio data encoded for compression (whether lossy or lossless) or other purpose, such as audio data encoded in an MP3 format or other MPEG audio format, AC-3, DTS, ATRAC, WMA, RealAudio, Ogg Vorbis, APT X100, FLAC, Shorten, Monkey's Audio, or other. Encoding involves modifications to the encoded audio data, such as modifications to coding coefficients and/or to predefined decision thresholds. Processing the audio to read the code is carried out by detecting such modifications using knowledge of predefined audio encoding parameters.

It will be appreciated that various known encoding techniques may be employed, either alone or in combination with the above-described techniques. Such known encoding techniques include, but are not limited to FSK, PSK (such as BPSK), amplitude modulation, frequency modulation and phase modulation.

In certain embodiments, certain encoding techniques, such as those described in U.S. Pat. No. 6,871,180 to Neuhauser, et al., disclose audio encoding techniques that encode audio with one or more continuously repeating messages, each including a number of code symbols following one after the other along a timebase of the audio signal. Each code symbol comprises a plurality of frequency components. In certain embodiments of system 10 that are adapted to read continuously repeating messages, acoustic energy, or, sound, picked up by the monitoring device 12 is continuously monitored to detect the embedded symbols comprising an encoded message. That is, decoding of an encoded message in the audio signal occurs continuously throughout operation of the system 10. In doing so, system 10 performs an FFT by means of processor 14 which is carried out on a continuing basis transforming a time segment of the audio signal to the frequency domain. In certain ones of such embodiments, a segment thereof comprising a one-quarter second duration is transformed to the frequency domain using an FFT, such that the segments overlap by, for example, 40%, 50%, 60%, 70% or 80%. System 10 separately evaluates for each component of the frequency code symbols in the encoded message whether the received energy comprises either a message or noise first by formulating a quotient comprising an associated energy value of a given frequency bin that would indicate such frequency components relative to a noise level associated with neighboring frequency bins. The noise level is obtained by averaging the energy levels of a predetermined number of frequency ranges neighboring the selected frequency bin being evaluated.

Storage 16 implements one or more accumulators for storage of the quotients associated with varying portions of the audio signal. Storage 16, for instance comprising a first-in/first-out (FIFO) buffer, enables each of the quotients to be continuously, repeatedly accumulated and sorted according to predetermined criteria. Such criteria comprises, optionally, a message length equal to that of the accumulator. Accordingly, where there are multiple messages simultaneously present in the audio, each accumulator serves to accumulate the frequency components of the code symbols in a respective one of the messages. In certain ones of these embodiments, multiple messages are detected as disclosed in U.S. Pat. No. 6,845,360 to Jensen, et al. Accumulation of the messages in this manner comprises an advantage of reducing the influence of noise which factors into the reading of the message.

As explained above, signatures are formed from the same audio data in the frequency domain that is used to decode the encoded messages in the audio.

Suitable techniques for extracting signatures include those disclosed in U.S. Pat. No. 5,612,729 to Ellis, et al. and in U.S. Pat. No. 4,739,398 to Thomas, et al., each of which is assigned to the assignee of the present application and both of which are incorporated herein by reference in their entireties.

Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel, PCT Publication WO02/11123 to Wang, et al. and PCT publication WO91/11062 to Young, et al., all of which are incorporated herein by reference in their entireties.

It is contemplated that system 10 comprise software and/or hardware enabling the extraction of signatures from received audio signals. The software is configured to direct the processor 14 to retain the time at which a particular signature is extracted, and to direct storage thereof in storage 16. The signatures gathered by system 10 are communicated by communications 18 to a processing facility for matching with reference signatures for identifying the broadcast audio signal, or portion thereof.

In certain embodiments, when using data resulting from an FFT performed across a predetermined frequency range, the FFT data from an even number of frequency bands (for example, eight, ten, sixteen or thirty two frequency bands) spanning the predetermined frequency range are used two bands at a time during successive time intervals. FIG. 6 provides an example of how pairs of the bands are selected in these embodiments during successive time intervals where the total number of bands used is equal to ten. The selected bands are indicated by an "X".

When each band is selected, the energy values of the FFT bins within such band and such time interval are processed to form one bit of the signature. If there are ten FFT's for each time interval of the audio signal, for example, the values of all bins of such band within the first five FFT's are summed to form a value "A" and the values of all bins of such band within the last five FFT's are summed to form a value "B". In the case of a received broadcast audio signal, the value A is formed from portions of the audio signal that were broadcast prior to those used to form the value B or which represent earlier portions of the audio signal relative to its time base.

To form a bit of the signature, the values A and B are compared. If B is greater than A, the bit is assigned a value "1" and if A is greater than or equal to B, the bit is assigned a value of "0". Thus, during each time interval, two bits of the signature are produced.

Each bit of the signature is a representation of the energy content in the band represented thereby during a predetermined time period, and may be referred to as the "energy slope" thereof. Because any one energy slope is associated with a particular band, as opposed to being associated with a representation of energy content across a group of bands or between certain ones of various bands, the impact of fluctuations in the relative magnitudes of reproduced audio among frequency bands is virtually eliminated.

In certain embodiments, signatures are extracted continuously. In such embodiments, information is obtained without a dependency on a triggering, predetermined event, or other type of prompting, and thus through uninterrupted information gathering, the signatures obtained will, necessarily, contain more information. For instance, this additional information is manifested in a signature, or portion thereof, that is formed of information as to how the audio signal changes over time as well as with frequency. This is in contrast to signature extraction occurring only upon prompting caused by a predetermined event and detection thereof, whereby information then obtained is only representative of the audio signal characterized within a certain isolated time frame.

Typically, frequency bins or bands of different size are employed to extract signatures and read codes. For example, relatively narrow bin sizes, such as 2, 4 or 6 Hz are used to detect the presence of a component of an ancillary code, while signature extraction requires the use of wider bands, such as 30, 40 or 60 Hz to ensure that the band energy is sufficient to permit the extraction of a reliable signature or signature portion. Accordingly, in an advantageous embodiment of the invention that employs a time domain-to-frequency domain transformation that distributes the energy of an audio signal into a plurality of frequency bins or bands, the size or sizes of the bins or bands are each selected to have a first, relatively narrow frequency width. The energy values of such frequency bins or bands are processed to read an ancillary code therefrom. These energy values are also combined in groups of contiguous bins or bands (such as by addition) to produce frequency band values each representing an energy level within a frequency band comprising the respective group. Such frequency band values are then processed to extract a signature therefrom.

Figure 3:
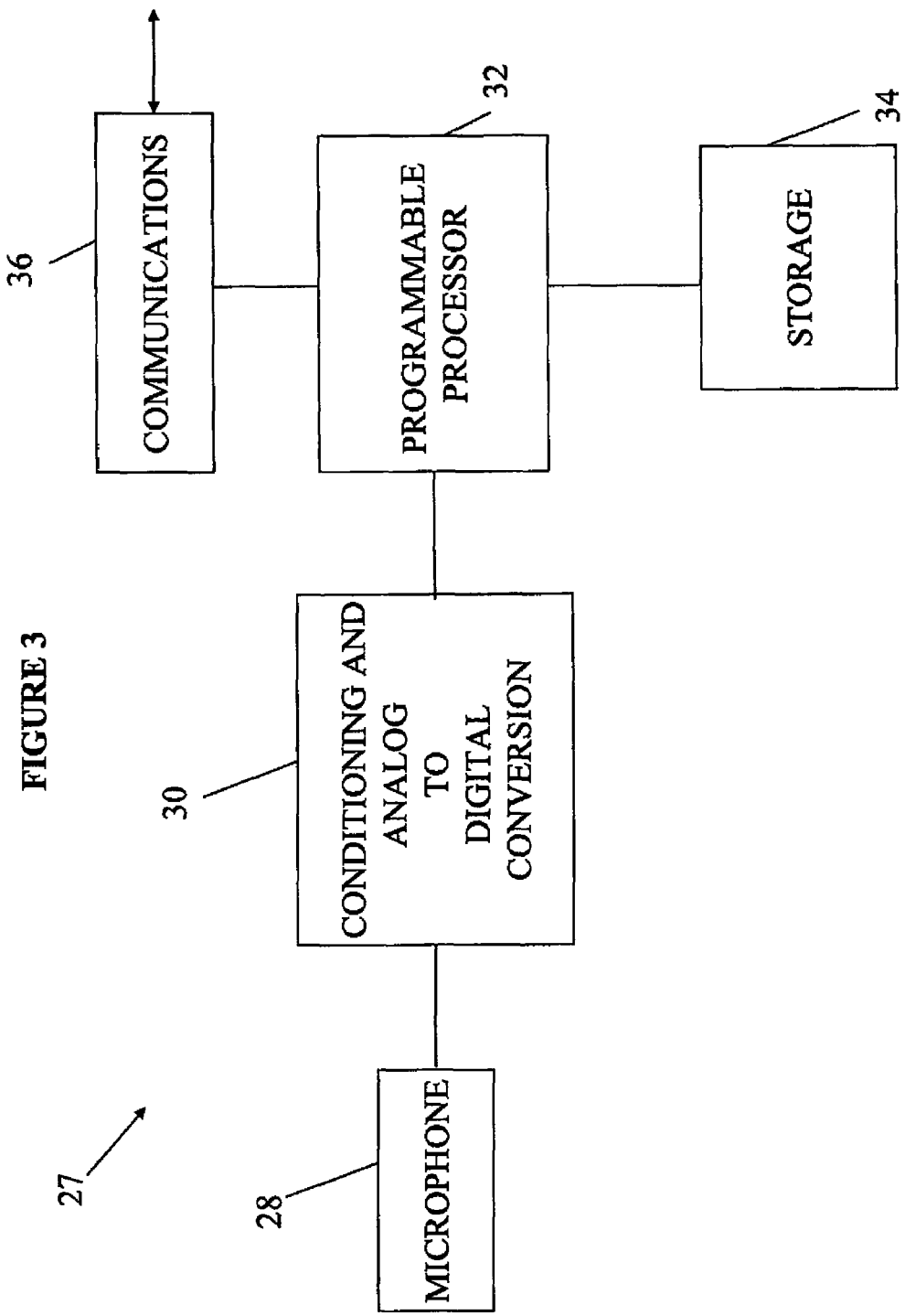
FIG. 3 is a functional block diagram of a system for gathering research data.

With reference to FIG. 3, which illustrates at least one of certain advantageous embodiments of the system, a PUA 27 is shown which is configured for gathering research data. Audio data is received at the microphone 28, which may also comprise a peripheral of the PUA 27 allowing it to be located a distance from the remainder thereof should doing so provide added convenience to the user. The audio data is then conditioned and converted from its analog format to digital data, as shown at 30, in a manner understood by one of ordinary skill in the art. A programmable processor 32 coupled with the system then transforms the digital data to the frequency domain, optionally by DFT, FFT or other transform technique including DCT, wavelet transform, Hadamard transform, or else by digital or analog filtering. The PUA 27 further comprises storage 34, comprising a buffer such as a FIFO buffer addressed herein, for cooperation with the processor 32 in a manner well understood by one of ordinary skill in the art, to both decode an ancillary code and extract a signature from the single data set produced by, for example, an FFT. Communications 36 receives data processed by the processor 32 and is coupled thereto for delivery to a remote processing location. In certain embodiments, storage 34 serves to retain information not immediately transmitted to communications 36.

Figure 4:
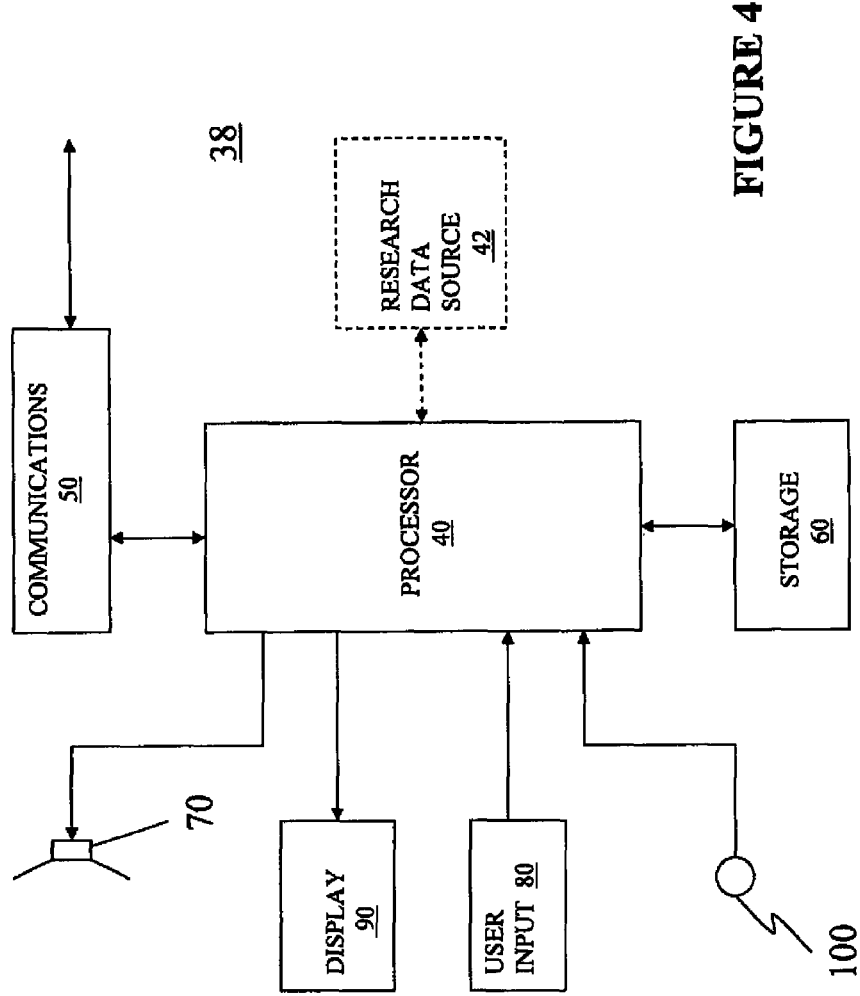
FIG. 4 is a diagram of a further system for gathering research data.
Figure 4A:
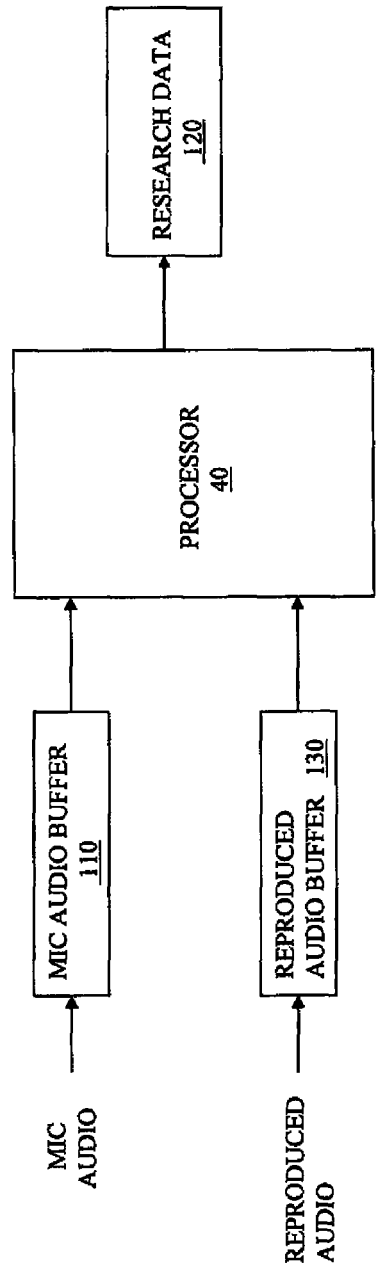
FIG. 4A is a functional block diagram for use in explaining certain embodiments of the system of FIG. 4.

With reference to FIGS. 4 and 4A, there is illustrated a block diagram of a cellular telephone 38 modified to carry out a research operation. The cellular telephone 38 comprises a processor 40 operative to exercise overall control of the cellular telephone's operation and to process audio and other data for transmission or reception. Communications 50 is coupled to the processor 40 and is operative to establish and maintain a two-way wireless communication link with a respective cell of a cellular telephone network. In certain embodiments, processor 40 is configured to execute applications apart from or in conjunction with the conduct of cellular telephone communications, such as applications serving to download audio and/or video data to be reproduced by the cellular telephone, e-mail clients and applications enabling the user to play games using the cellular telephone. In certain embodiments, processor 40 comprises two or more processing devices, such as a first processing device (such as a digital signal processor) that processes audio, and a second processing device that exercises overall control over operation of the cellular telephone. In certain embodiments, processor 40 comprises a single processing device. In certain embodiments, some or all of the functions of processor are implemented by hardwired circuitry.

Cellular telephone 38 further comprises storage 60 coupled with processor 40 and operative to store data as needed. In certain embodiments, storage 60 comprises a single storage device, while in others it comprises multiple storage devices. In certain embodiments, a single device implements certain functions of both processor 40 and storage 60.

In addition, cellular telephone 38 comprises a microphone 100 coupled with processor 40 and serving to transduce the user's voice to an electrical signal which it supplies to processor 40 for encoding, and a speaker and/or earphone 70 coupled with processor 40 to transduce received audio from processor 40 to an acoustic output to be heard by the user. Cellular telephone 38 also includes a user input 80 coupled with processor 40, such as a keypad, to enter telephone numbers and other control data, as well as a display 90 coupled with processor 40 to provide data visually to the user under the control of processor 40.

In certain embodiments, cellular telephone 38 provides additional functions and/or comprises additional elements. In certain ones of such embodiments, the cellular telephone 38 provides e-mail, text messaging and/or web access through its wireless communications capabilities, providing access to media and other content. For example, Internet access via cellular telephone 38 enables access to video and/or audio content that can be reproduced by the cellular telephone 38 for the user, such as songs, video on demand, video clips and streaming media. In certain embodiments, storage 60 stores software providing audio and/or video downloading and reproducing functionality, such as iPod® software, enabling the user to reproduce audio and/or video content downloaded from a source, such as a personal computer via communications 50 or through direct Internet access via communications 50.

To enable cellular telephone 38 to gather research data, namely, data indicating exposure to audio such as programs, music and advertisements, research software is installed therein to control processor 40 to gather such data and communicate it via communications 50 to a research organization. The research software in certain embodiments also controls processor 40 to store the data in storage 60 for subsequent communication.

The research software controls the processor 40 to transduce the time-domain audio data produced by microphone 100 to frequency domain data and to read ancillary codes from the frequency domain data using one or more of the known techniques identified hereinabove, and then to store and/or communicate the codes that have been read for use as research data indicating encoded audio to which the user was exposed. The research software also controls the processor 40 to extract signatures from the frequency domain data using one or more of the known techniques identified hereinabove, and then to store and/or communicate the extracted signature data for use as research data which is then matched with reference signatures representing known audio to detect the audio to which the user was exposed. In certain embodiments, the research software controls the processor 40 to store samples of the transduced audio, either in compressed or uncompressed form for subsequent processing to read ancillary codes therein and to extract signatures therefrom after transformation to the frequency domain. In certain embodiments, the research software is operative both to read codes and extract signatures from the audio data, and selectively (a) both reads such codes and extracts such signatures from certain portions of the audio data and/or (b) reads codes from certain portions of the audio data and extracts signatures from other portions of the audio data.

Where the cellular telephone 38 possesses functionality to download and/or reproduce presentation data, in certain embodiments, research data concerning the usage and/or exposure to such presentation data as well as audio data received acoustically by microphone 100, is gathered by cellular telephone 38 in accordance with the technique illustrated by the functional block diagram of FIG. 4A. Storage 60 of FIG. 4 implements an audio buffer 110 for audio data gathered with the use of microphone 100. In certain ones of these embodiments storage 60 implements a buffer 130 for presentation data downloaded and/or reproduced by cellular telephone 38 to which the user is exposed via speaker and/or earphone 70 or display 90, or by means of a device coupled with cellular telephone 38 to receive the data therefrom to present it to a user. In some of such embodiments, the reproduced data is obtained from downloaded data, such as songs, web pages or audio/video data (e.g., movies, television programs, video clips). In some of such embodiments, the reproduced data is provided from a device such as a broadcast or satellite radio receiver of the cellular telephone 38 (not shown for purposes of simplicity and clarity). In certain ones of these embodiments storage 60 implements a buffer 130 for metadata of presentation data reproduced by cellular telephone 38 to which the user is exposed via speaker and/or earphone 70 or display 90, or by means of a device coupled with cellular telephone 38 to receive the data therefrom to present it to a user. Such metadata can be, for example, a URL from which the presentation data was obtained, channel tuning data, program identification data, an identification of a prerecorded file from which the data was reproduced, or any data that identifies and/or characterizes the presentation data, or a source thereof. Where buffer 130 stores audio data, buffers 110 and 130 store their audio data (either in the time domain or the frequency domain) independently of one another. Where buffer 130 stores metadata of audio data, buffer 110 stores its audio data (either in the time domain or the frequency domain) and buffer 130 stores its metadata, each independently of the other.

Processor 40 separately produces research data 120 from the contents of each of buffers 110 and 130 which it stores in storage 60. In certain ones of these embodiments, one or both of buffers 110 and 130 is/are implemented as circular buffers storing a predetermined amount of time-domain audio data representing a most recent time interval thereof as received by microphone 100 and/or reproduced by speaker and/or earphone 70, or downloaded by cellular telephone 38 for reproduction by a different device coupled with cellular telephone 38. Processor 40 extracts signatures and/or decodes ancillary codes in the buffered audio data to produce research data 120 by converting the time-domain audio data to frequency-domain audio data and processing the frequency-domain audio data for reading an ancillary code therefrom and extracting a signature therefrom. Where metadata is received in buffer 130, in certain embodiments the metadata is used, in whole or in part, as research data, or processed to produce research data. The research data is thus gathered representing exposure to and/or usage of audio data by the user where audio data is received in acoustic form by the cellular telephone 38 and where presentation data is received in non-acoustic form (for example, as a cellular telephone communication, as an electrical signal via a cable from a personal computer or other device, as a broadcast or satellite signal or otherwise).

With reference again to FIG. 4, in certain embodiments, the cellular telephone 38 comprises a research data source 42 coupled by a wired or wireless coupling with processor 40 for use in gathering further or alternative research data to be communicated to a research organization. In certain ones of these embodiments, the research data source 42 comprises a location data producing device or function providing data indicating a location of the cellular telephone 38. Various devices appropriate for use as the research data source 42 include a satellite location signal receiver, a terrestrial location signal receiver, a wireless networking device that receives location data from a network, an inertial location monitoring device and a location data producing service provided by a cellular telephone service provider. In certain embodiments, research data source 42 comprises a device or function for monitoring exposure to print media, for determining whether the user is at home or out of home, for monitoring exposure to products, exposure to displays (such as outdoor advertising), presence within or near commercial establishments, or for gathering research data (such as consumer attitude, preference or opinion data) through the administration of a survey to the user of the cellular telephone 38. In certain embodiments, research data source 42 comprises one or more devices for receiving, sensing or detecting data useful in implementing one or more of the foregoing functions, other research data gathering functions and/or for producing data ancillary to functions of gathering, storing and/or communicating research data, such as data indicating whether the panelist has complied with predetermined rules governing the activity or an extent of such compliance. Such devices include, but are not limited to, motion detectors, accelerometers, temperature detectors, proximity detectors, satellite positioning signal receivers, RFID readers, RF receivers, wireless networking transceivers, wireless device coupling transceivers, pressure detectors, deformation detectors, electric field sensors, magnetic field sensors, optical sensors, electrodes, and the like.

Figure 5:
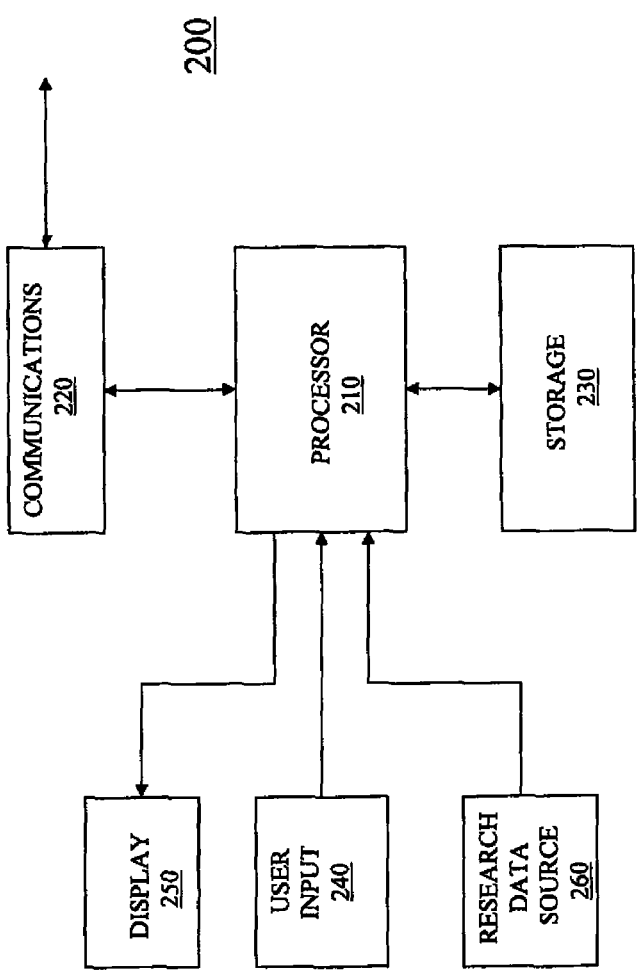
FIG. 5 is a diagram of a further system for gathering research data.

With reference to FIG. 5, there is illustrated a personal digital assistant (PDA) 200 modified to gather research data. The PDA 200 comprises a processor 210 operative to exercise overall control and to process data for, among other purposes, transmission or reception by the PDA 200. Communications 220 is coupled to the processor 210 and is operative under the control of processor 210 to perform those functions required for establishing and maintaining two-way communications over a network (not shown for purposes of simplicity and clarity).

In certain embodiments, processor 210 comprises two or more processing devices, such as a first processing device that controls overall operation of the PDA 200 and a second processing device that performs certain more specific operations such as digital signal processing. In certain embodiments, processor 210 employs a single processing device. In certain embodiments, some or all of the functions of processor 210 are implemented by hardwired circuitry.

PDA 200 further comprises storage 230 coupled with processor 210 and operative to store software that runs on processor 210, as well as temporary data as needed. In certain embodiments, storage 230 comprises a single storage device, while in others it comprises multiple storage devices. In certain embodiments, a single device implements certain functions of both processor 210 and storage 230.

PDA 200 also includes a user input 240 coupled with processor 210, such as a keypad, to enter commands and data, as well as a display 250 coupled with processor 210 to provide data visually to the user under the control of processor 210.

In certain embodiments, the PDA 200 provides additional functions and/or comprises additional elements. In certain embodiments, PDA 200 provides cellular telephone functionality, and comprises a microphone and audio output (not shown for purposes of simplicity and clarity), as well as an ability of communications 220 to communicate wirelessly with a cell of a cellular telephone network, to enable its operation as a cellular telephone. Where PDA 200 possesses cellular telephone functionality, in certain embodiments PDA 200 is employed to gather, store and/or communicate research data in the same manner as cellular telephone 38 (such as by storing appropriate research software in storage to run on processor), and communicates with system 10 in the same manner to set up, promote, operate, maintain and/or terminate a research operation using PDA 200.

In certain embodiments, communications 220 of PDA 200 provides wireless communications via Bluetooth protocol, ZigBec™ protocol, wireless LAN protocol, infrared data link, inductive link or the like, to a network, network host or other device, and/or through a cable to such a network, network host or other device. In such embodiments, PDA 200 is employed to gather, store and/or communicate research data in the same manner as cellular telephone 38 (such as by storing appropriate research software in storage to run on processor), and communicates with system 10 in the same manner (either through a wireless link or through a connection, such as a cable) to set up, promote, operate, maintain and/or terminate a research operation using PDA 200.

PDA 200 receives audio data in the form of acoustic data and/or audio data communicated in electronic form via a wireless or wired link. PDA stores research software enabling PDA 200 to gather research data, namely, data indicating exposure to such audio data, by controlling processor 210 to gather such data and communicate it via communications 220 to a research organization. The research software in certain embodiments also controls processor 210 to store the data in storage 230 for subsequent communication. That is, processor 210 is controlled to read codes from the audio data and extract signatures therefrom in the same manner as any one or more of the embodiments explained hereinabove.

In certain embodiments, the PDA 200 comprises a research data source 260 coupled by a wired or wireless coupling with processor 210 for use in gathering further or alternative research data to be communicated to a research organization. In certain ones of these embodiments, the research data source 260 comprises a location data producing device or function providing data indicating a location of the cellular telephone PDA 200. Various devices appropriate for use as source include a satellite location signal receiver, a terrestrial location signal receiver, a wireless networking device that receives location data from a network, an inertial location monitoring device and a location data producing service provided by a cellular telephone service provider. In certain ones of these embodiments, research data source 260 comprises a device or function for monitoring exposure to print media, for determining whether the user is at home or out of home, for monitoring exposure to products, exposure to displays (such as outdoor advertising), presence within or near commercial establishments, or for gathering research data (such as consumer attitude, preference or opinion data) through the administration of a survey to the user of the PDA 200. In certain ones of these embodiments, research data source comprises one or more devices for receiving, sensing or detecting data useful in implementing one or more of the foregoing functions, other research data gathering functions and/or for producing data ancillary to functions of gathering, storing and/or communicating research data, such as data indicating whether the panelist has complied with predetermined rules governing the activity or an extent of such compliance. Such devices include, but are not limited to, motion detectors, accelerometers, temperature detectors, proximity detectors, satellite positioning signal receivers, RFID readers, RF receivers, wireless networking transceivers, wireless device coupling transceivers, pressure detectors, deformation detectors, electric field sensors, magnetic field sensors, optical sensors, electrodes, and the like.

Figure 7:
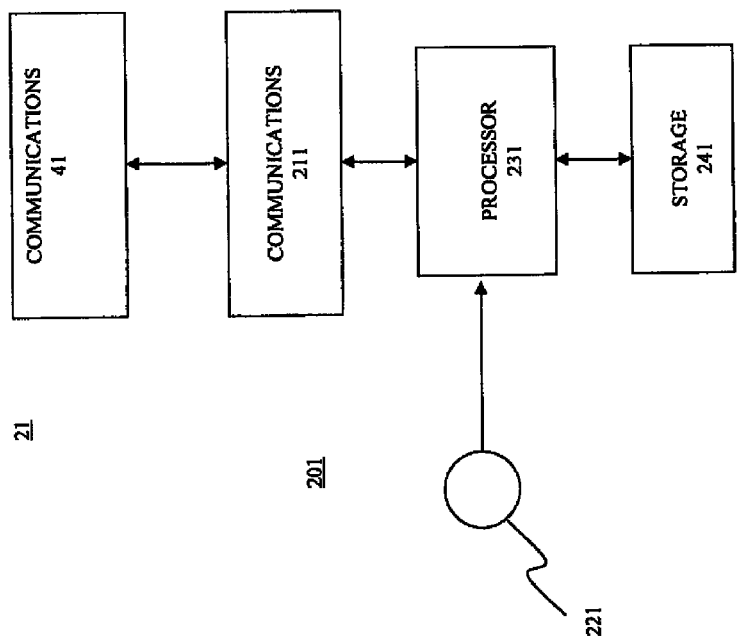
FIG. 7 is a diagram of a further system for gathering research data.

FIG. 7 illustrates a PUA 21 coupled by its communications 41 with communications 211 of a research system 201 comprising a microphone 221, a processor 231 coupled with microphone 221 and with communications 211 by a wired or wireless link. Research system 201 in certain embodiments comprises storage 241 coupled with processor 231. In certain embodiments, communications 41 is operative to communicate data to a research data processing facility. In certain embodiments, communications 41 is further operative to communicate data with the research system 201. Such communications between the PUA 21 and research system 201 may be triggered by, for example, either (1) the elapse of a predetermined interval of time, (2) production of a communications request or query by either the PUA 21 or the research system 201, (3) the storage of a predetermined amount of data by either PUA 21 and/or research system 201, (4) proximity of PUA 21 and the research system 201, or (5) any combination of (1)-(4). In certain embodiments, communications 41 of PUA 21 comprises a transceiver configured to communicate using a Bluetooth protocol, ZigBee™ protocol, wireless LAN protocol, or via an infrared data link, inductive link or the like, for enabling communications with the research system 201 as well as with a network, network host or other device to communicate data to a research data processing facility. In certain embodiments, communications 41 of PUA 21 comprises a first transceiver configured to communicate with research system 201 and a second transceiver (such as a cellular telephone transceiver) configured to communicate with the research data processing facility.

In certain embodiments research system 201 is housed separately from PUA 21 and is physically separated therefrom, but both are carried on the person of a panelist. In certain embodiments, research system 201 is housed separately from PUA 21 but is either (1) affixed to an exterior surface thereof, (2) carried by or in a common container or carriage device with PUA 21, (3) carried by or in a cover of PUA 21 (such as a decorative "skin"), or (4) arranged to contain PUA 21. In certain embodiments, PUA 21 and research system 201 are contained by a common housing.

In certain ones of such embodiments, processor 231 of research system 201 serves to read ancillary codes and extract signatures from audio data transduced by the microphone 221 in the manner described above in connection with the embodiments of FIGS. 1 through 5. Certain ones of these embodiments communicate the ancillary codes that have been read and the signatures that have been extracted to the PUA 21 by communications 211 for storage and/or communication from the PUA.

In certain ones of these embodiments, storage 241 serves to store the ancillary codes and/or signatures for subsequent communication to the PUA 21.

In certain ones of such embodiments, research system 201 serves to store audio data transduced by the microphone 221 in storage 241, and subsequently communicates the audio data to PUA 21 via communications 211. PUA 21 processes the audio data as described hereinabove to produce research data therefrom.

In certain ones of such embodiments, research system 201 receives audio data from PUA 21 via communications 211 and processor 231 serves to produce research data from the audio data which either is stored in storage 241 and subsequently communicated to PUA 21 by communications 211 or communicated thereby without prior storage in research system 201.

In certain ones of such embodiments, processor 231 of research system 201 receives presentation data and/or metadata of the presentation data from PUA 21 via communications 211 and processes the presentation data and/or metadata to produce research data therefrom. Such presentation data and metadata is received by PUA 21 in a form other than acoustic data such as electrical or electromagnetic data. Research system 201 either stores such research data in storage 241 and subsequently communicates it to PUA 21 by communications 211, or communicates the research data to PUA 21 by communications 211 without prior storage in research system 201.

In certain embodiments of research system 201, processor 231 adds a time and/or date stamp to research data, media data, presentation data or metadata of one of the foregoing received, produced, stored or communicated thereby.

In certain ones of such embodiments, research system 201 receives audio data, presentation data and/or metadata of one of the foregoing from PUA 21 via communications 211 and stores the received data in storage 241. Subsequently, system 201 reads the stored data from storage 241 and communicates it to PUA 21 which either processes it to produce research data therefrom or communicates it to a processing facility for producing research data. Communication of the research data from the PUA 21 affords a number of advantages. At least a first advantage includes being able to provide a user a research system of smaller size and lower weight since (1) it need not itself comprise hardware enabling communication of the research data to the processing facility, (2) a smaller power source, commonly a battery, thus decreasing the size and weight of the research system may be used for operation thereof, and (3) less data storage capacity is necessary in the research system given the opportunity for frequent communication of research data between the PUA 21 and the research system 201. At least a second advantage includes an opportunity for increased frequency of reporting of the research data to the research data processing facility since the PUA 21 is readily available for the communication thereof.

In certain ones of the foregoing embodiments, PUA 21 gathers media data research data from media data received thereby in non-acoustic form and/or metadata of such media data. PUA 21 either stores such media data research data and later communicates it to a research organization via communications 41, or communicates it without first storing it. In certain ones of such embodiments, PUA 21 receives audio data research data from system 201 produced thereby from audio data, and communicates the audio data research data to a research organization via communications 41. In certain ones of such embodiments, PUA 21 combines the audio data research data and the media data research data for communication to a research organization via communications 41.

Figure 7A:
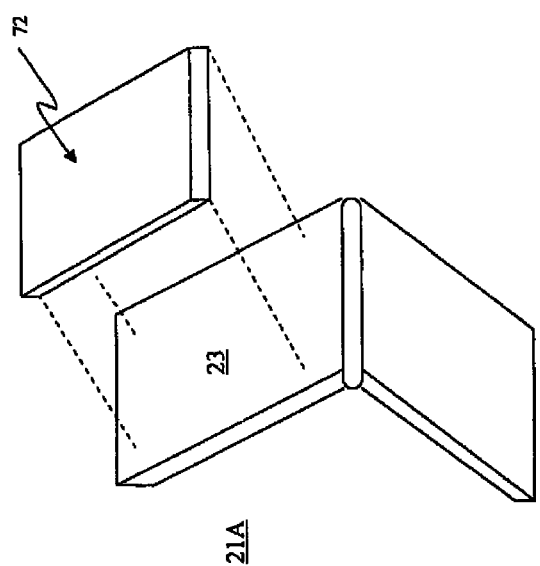
FIG. 7A is an exploded view of a PUA with a research data monitor affixed thereto.

FIG. 7A illustrates a research data monitor 72 affixed to an outer surface 23 of a PUA 21A, wherein the monitor 72 is operative in certain embodiments to gather research data and communicate it to PUA 21A which in turn communicates the research data to a processing facility for use in preparing reports including research data. PUA 21A is illustrated in the block diagram of FIG. 7B. In certain embodiments, monitor 72 implements one or more of the research operations described above in connection with FIG. 7. As shown in FIG.

Figure 7B:
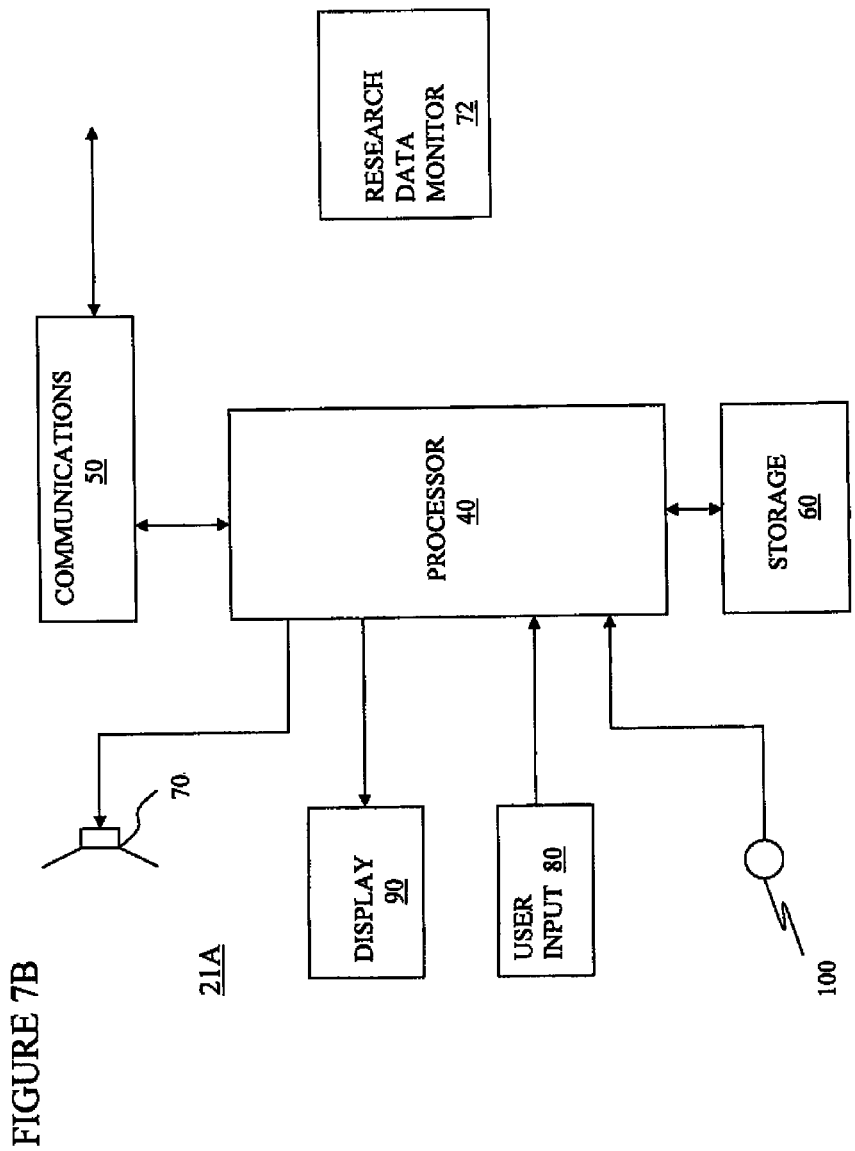
FIG. 7B is a block diagram of the PUA according to FIG. 7A coupled with a research data monitor.

7B, PUA 21A comprises the same elements as PUA 38 of FIG. 4, except that research data source 96 is omitted from the embodiment of FIG. 7B.

Figure 7C:
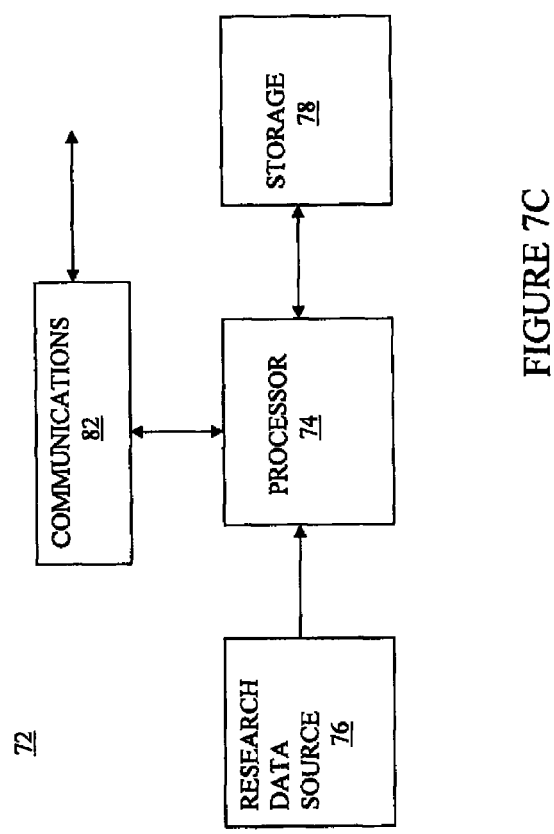
FIG. 7C is a block diagram of the research data monitor of FIGS. 7A and 7B.

Research data monitor 72 is illustrated in the block diagram of FIG. 7C. The research data monitor 72 comprises a processor 74 that is operative to exercise overall control of the monitor 72 and to process data for transmission or reception and communications 82 coupled to the processor 74 and operative under the control of processor 74 to perform those functions required for conducting communications with PUA 21A. In certain embodiments, processor 74 comprises two or more processing devices, such as a first processing device (such as a digital signal processor) that processes research data, such as audio data, and a second processing device that exercises overall control over operation of the monitor 72. In certain embodiments, processor 74 employs a single processing device. In certain embodiments, some or all of the functions of processor 74 are implemented by software, while in other embodiments, the functions of processor 74 are implemented in hardwired circuitry without the use of software.

In certain embodiments, communications 82 establishes and maintains a wireless communication link with communications 50 of PUA 21A, using a Bluetooth™ protocol, a ZigBee™ protocol, an inductive link, a capacitive link, an RF link, infrared link, or otherwise. In certain embodiments, communications 82 communicates with communications 50 using a wired link, such as a USB interface, a Firewire® interface, a connection to a plug or jack of the PUA 21A or an internal connection to PUA 21A.

Research data monitor 72 further comprises a research data source 76 coupled with processor 74. In certain embodiments, research data monitor 72 comprises a microphone that serves to transduce acoustic energy for processing by processor 74 to produce research data. In certain embodiments, research data source 76 comprises a keypad that enables the user to input data, such as channel or station data, user identification data or another kind of research data. In certain embodiments, monitor 72 comprises an RF receiver and/or infrared radiation detector. In certain embodiments, monitor 72 comprises a location data producing device or function providing data indicating a location of the monitor 72. Various devices appropriate for use as research data source 76 include a satellite location signal receiver, a terrestrial location signal receiver, a wireless networking device that receives location data from a network, an inertial location monitoring device and a location data producing service provided by a PUA service provider. In certain embodiments, monitor 76 comprises a device or function for monitoring exposure to print media, for determining whether the user is at home or out of home, for monitoring exposure to products, exposure to displays (such as outdoor advertising), presence within or near commercial establishments, or for gathering research data (such as consumer attitude, preference or opinion data) through the administration of a survey to the user of the PUA 21A. In certain embodiments, monitor 76 comprises one or more devices for receiving, sensing or detecting data useful in implementing one or more of the foregoing functions, other research data gathering functions and/or for producing data ancillary to functions of gathering, storing and/or communicating research data, such as data indicating whether the panelist has complied with predetermined rules governing the activity or an extent of such compliance. Such devices include, but are not limited to, motion detectors, accelerometers, temperature detectors, proximity detectors, satellite positioning signal receivers, RFID readers, RF receivers, wireless networking transceivers, wireless device coupling transceivers, pressure detectors, deformation detectors, electric field sensors, magnetic field sensors, optical sensors, electrodes, and the like.

Monitor 72 further comprises storage 78 coupled with processor 74 and operative to store data as needed. In certain embodiments, storage 78 comprises a single storage device, while in others it comprises multiple storage devices. In certain embodiments, a single device implements certain functions of both processor 74 and storage 78.

Figure 7D:
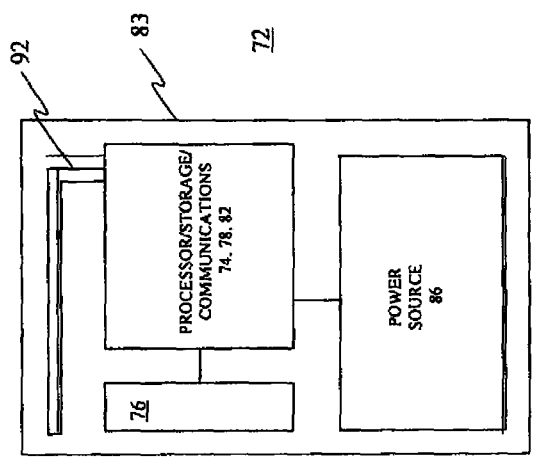
FIG. 7D is a layout diagram of an embodiment of the research data monitor of FIGS. 7A, 7B and 7C.

FIG. 7D illustrates an embodiment of research data monitor 72 fabricated on a substrate 83, such as a printed circuit board or a flexible substrate comprising paper, plastic or the like, on which certain elements of monitor 72 are printed on substrate 83. Power source 86 comprises a battery (either rechargeable or non-rechargeable) or a charge storage device such as a capacitor, printed on substrate 83. In the embodiment of FIG. 7D, communications 82 comprises an RF transceiver, such as a Bluetooth™ transceiver, a ZigBee™ transceiver or other RF transceiver. An antenna 92 is printed on substrate 83 and coupled with communications 82. It will be appreciated that monitor 72 can be fabricated to have a very thin profile and very low weight, so that it may be affixed to the enclosure of a cellular telephone, a PDA or other PUA that is carried on the person of a participant, without adding substantially to its size or weight. In certain embodiments, the monitor 72 is carried by a cover for the PUA (such as a decorative "skin"). In certain embodiments, monitor 72 is housed in or carried by a device separate from the PUA and adapted to be carried with the person of a panelist who carries the PUA.

FIG. 7E is a block diagram of a PUA comprising a personal communication device adapted to be carried on the person of a participant (such as a PDA, Blackberry® device, pager, notebook computer, walkie talkie, or the like) having a processor 94, and communications 95, user data source 96 and storage 97 coupled with processor 94. A research data gathering device 93, adapted to be carried on the person of a participant, is operative to gather research data and communicate the same wirelessly to communications 95 of the personal communication device for subsequent communication by the personal communication device to a research data processing facility. In certain embodiments, the research data gathering device 93 is separate from the personal communication device, so that it is carried by the participant separately therefrom. In certain ones of such embodiments, the device 93 is contained in a PUA such as an article of jewelry, an article of clothing, a fob, a wristwatch or other PUA. In certain ones of such embodiments, the device 93 is contained in its own enclosure and is carried on a lanyard to be worn about the participant's neck or provided with a pin, clasp or belt clip for attachment to an article of the participant's clothing.

As noted hereinabove, research software is provided to those of the foregoing devices implementing research operations by means of programmed processors. In certain embodiments, the research software is stored at the time of manufacture. In others, it is installed subsequently, either by a distributor, retailer, user, service provider, research organization or other entity by download to the respective device or by installation of a storage device storing the research software as firmware, or otherwise.

Although various embodiments have been described with reference to a particular arrangement of parts, features and the like, these are not intended to exhaust all possible arrangements or features, and indeed many other embodiments, modifications and variations will be ascertainable to those of skill in the art.

What is claimed is:

1. A method to monitor presentation of media, the method comprising:
    determining, with a processor, first frequency-domain data from time-domain audio data corresponding to the media, the first frequency-domain data including first frequency band values associated with respective first frequency bands;
    combining, with the processor, respective ones of the first frequency band values associated with contiguous groups of the first frequency bands to determine second frequency-domain data including second frequency band values associated with respective second frequency bands;
    processing, with the processor, the first frequency-domain data to obtain a code included in an audio portion of the media; and
    processing, with the processor, the second frequency-domain data to obtain a signature representative of the audio portion of the media.

2. The method as defined in claim 1, wherein the second frequency bands are wider than the first frequency bands.

3. The method as defined in claim 1, wherein the combining of the respective ones of the first frequency band values to determine the second frequency-domain data includes adding the respective ones of the first frequency band values associated with the contiguous groups of the first frequency bands to determine the second frequency-domain data.

4. The method as defined in claim 1, wherein the combining of the respective ones of the first frequency band values to determine the second frequency-domain data includes combining the respective first frequency band values associated with a first contiguous group of the first frequency bands to determine a first one of the second frequency band values associated with a first one of the second frequency bands.

5. The method as defined in claim 4, wherein the first one of the second frequency bands includes the first contiguous group of the first frequency bands, and the first one of the second frequency band values corresponds to an energy level of the first contiguous group of the first frequency bands.

6. The method as defined in claim 1, wherein the processing of the second frequency-domain data to obtain the signature includes:
    determining energy slopes associated with respective ones of the second frequency bands; and
    determining the signature based on the respective energy slopes determined for the second frequency bands.

7. The method as defined in claim 1, wherein the determining of the first frequency-domain data includes performing a fast Fourier transform on the time-domain audio data to determine the first frequency-domain data.

8. A tangible machine readable storage device or storage disk comprising machine readable instructions which, when executed, cause a machine to at least:
    determine first frequency-domain data from time-domain audio data corresponding to a presentation of media, the first frequency-domain data including first frequency band values associated with respective first frequency bands;
    combine respective ones of the first frequency band values associated with contiguous groups of the first frequency bands to determine second frequency-domain data including second frequency band values associated with respective second frequency bands;
    process the first frequency-domain data to obtain a code included in an audio portion of the media; and
    process the second frequency-domain data to obtain a signature representative of the audio portion of the media.

9. The storage device or storage disk as defined in claim 8, wherein the second frequency bands are wider than the first frequency bands.

10. The storage device or storage disk as defined in claim 8, wherein the instructions cause the machine to combine the respective ones of the first frequency band values by adding the respective ones of the first frequency band values associated with the contiguous groups of the first frequency bands to determine the second frequency-domain data.

11. The storage device or storage disk as defined in claim 8, wherein the instructions cause the machine to combine the respective ones of the first frequency band values by combining the respective first frequency band values associated with a first contiguous group of the first frequency bands to determine a first one of the second frequency band values associated with a first one of the second frequency bands.

12. The storage device or storage disk as defined in claim 11, wherein the first one of the second frequency bands includes the first contiguous group of the first frequency bands, and the first one of the second frequency band values corresponds to an energy level of the first contiguous group of the first frequency bands.

13. The storage device or storage disk as defined in claim 8, wherein the instructions further cause the machine to process the second frequency-domain data to obtain the signature by:
    determining energy slopes associated with respective ones of the second frequency bands; and
    determining the signature based on the respective energy slopes determined for the second frequency bands.

14. The storage device or storage disk as defined in claim 8, wherein the instructions cause the machine to determine the first frequency-domain data by performing a fast Fourier transform on the time-domain audio data to determine the first frequency-domain data.

15. An apparatus comprising:
    a processor to:
        determine first frequency-domain data from time-domain audio data corresponding to a presentation of media, the first frequency-domain data including first frequency band values associated with respective first frequency bands;
        combine respective ones of the first frequency band values associated with contiguous groups of the first frequency bands to determine second frequency-domain data including second frequency band values associated with respective second frequency bands;
        process the first frequency-domain data to obtain a code included in an audio portion of the media; and
        process the second frequency-domain data to obtain a signature representative of the audio portion of the media; and
    a memory to store the code and the signature.

16. The apparatus as defined in claim 15, wherein the second frequency bands are wider than the first frequency bands.

17. The apparatus as defined in claim 15, wherein the processor is further to combine the respective ones of the first frequency band values by adding the respective ones of the first frequency band values associated with the contiguous groups of the first frequency bands to determine the second frequency-domain data.

18. The apparatus as defined in claim 15, wherein the processor is further to combine the respective ones of the first frequency band values by combining the respective first frequency band values associated with a first contiguous group of the first frequency bands to determine a first one of the second frequency band values associated with a first one of the second frequency bands.

19. The apparatus as defined in claim 18, wherein the first one of the second frequency bands includes the first contiguous group of the first frequency bands, and the first one of the second frequency band values corresponds to an energy level of the first contiguous group of the first frequency bands.

20. The apparatus as defined in claim 15, wherein the processor is further to determine the first frequency-domain data by performing a fast Fourier transform on the time-domain audio data to determine the first frequency-domain data, and the processor is further to process the second frequency-domain data to obtain the signature by:
   determining energy slopes associated with respective ones of the second frequency bands; and
   determining the signature based on the respective energy slopes determined for the second frequency bands.

* * * * *